(12) United States Patent
Martell et al.

(10) Patent No.: US 10,997,661 B2
(45) Date of Patent: *May 4, 2021

(54) SYSTEMS AND METHODS FOR MANAGING ELECTRONIC INTERACTIVE GAMING-BASED INVESTMENTS

(71) Applicant: Investable Games Technology Inc., Newport Beach, CA (US)

(72) Inventors: Jason Martell, Irvine, CA (US); Walter Cruttenden, Corona del Mar, CA (US)

(73) Assignee: INVESTABLE GAMES TECHNOLOGY INC., Newport Beach, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 16/165,665

(22) Filed: Oct. 19, 2018

(65) Prior Publication Data
US 2019/0057451 A1 Feb. 21, 2019

Related U.S. Application Data

(63) Continuation of application No. 15/197,249, filed on Jun. 29, 2016, now Pat. No. 10,192,271, which is a
(Continued)

(51) Int. Cl.
*G06Q 40/06* (2012.01)
*A63F 13/30* (2014.01)
(Continued)

(52) U.S. Cl.
CPC ............ *G06Q 40/06* (2013.01); *A63F 13/12* (2013.01); *A63F 13/30* (2014.09); *A63F 13/35* (2014.09);
(Continued)

(58) Field of Classification Search
None
See application file for complete search history.

(56) References Cited

U.S. PATENT DOCUMENTS

| D295,765 S | 5/1988 | Wells-Papanek et al. |
| 4,751,640 A | 6/1988 | Lucas et al. |

(Continued)

FOREIGN PATENT DOCUMENTS

| WO | WO-2016045504 A1 | 3/2016 |
| WO | WO-2019014140 A1 | 1/2019 |

OTHER PUBLICATIONS

Bakie, J. (2010). Private equity plays to win. UK Unquote, (428), 10. Retrieved from https://dialog.proquest.com/professional/docview/795421287?accountid=131444 on Dec. 18, 2020 (Year: 2010).*

(Continued)

*Primary Examiner* — Kito R Robinson
(74) *Attorney, Agent, or Firm* — Wilson Sonsini Goodrich & Rosati

(57) ABSTRACT

The field of the invention relates to systems and methods for facilitating investments through interactive online gaming. In one embodiment, an interactive electronic gaming system includes a game server for hosting a Web application game, accessible over a data network. One or more client communication devices are configured to access the game server. An index fund server is accessible over said data network for maintaining electronic investment portfolios. The game server is configured to intercept any electronic payment transactions over a payment gateway server through the Web application game from one or more client devices and redirect the intercepted transaction to the index fund server.

20 Claims, 7 Drawing Sheets

Related U.S. Application Data continuation of application No. 13/494,003, filed on Jun. 11, 2012, now Pat. No. 9,495,708.

(51) Int. Cl.

| | | |
|---|---|---|
| *G06Q 50/34* | (2012.01) | |
| *A63F 13/35* | (2014.01) | |
| *A63F 13/792* | (2014.01) | |
| *G06Q 20/10* | (2012.01) | |
| *G06Q 20/38* | (2012.01) | |
| *G06Q 20/40* | (2012.01) | |
| *G06Q 50/00* | (2012.01) | |
| *G07F 17/32* | (2006.01) | |
| *A63F 13/50* | (2014.01) | |
| *G06F 21/34* | (2013.01) | |
| *G06Q 40/04* | (2012.01) | |
| *G06F 21/60* | (2013.01) | |
| *G06Q 40/00* | (2012.01) | |

(52) U.S. Cl.
CPC ............ *A63F 13/50* (2014.09); *A63F 13/792* (2014.09); *G06Q 20/10* (2013.01); *G06Q 20/381* (2013.01); *G06Q 20/4014* (2013.01); *G06Q 50/01* (2013.01); *G06Q 50/34* (2013.01); *G07F 17/3209* (2013.01); *G07F 17/3225* (2013.01); *G07F 17/3244* (2013.01); *A63F 2300/57* (2013.01); *G06F 21/34* (2013.01); *G06F 21/606* (2013.01); *G06Q 40/00* (2013.01); *G06Q 40/04* (2013.01)

(56) References Cited

U.S. PATENT DOCUMENTS

| | | | |
|---|---|---|---|
| 5,202,826 A | 4/1993 | McCarthy | |
| 5,297,026 A | 3/1994 | Hoffman | |
| 5,483,444 A | 1/1996 | Heintzeman et al. | |
| 5,513,102 A | 4/1996 | Auriemma | |
| 5,537,314 A | 7/1996 | Kanter | |
| 5,621,640 A | 4/1997 | Burke | |
| 5,689,100 A | 11/1997 | Carrithers et al. | |
| 5,734,838 A | 3/1998 | Robinson et al. | |
| 5,774,870 A | 6/1998 | Storey | |
| 5,890,963 A * | 4/1999 | Yen | G07F 17/32 |
| | | | 463/42 |
| 6,070,153 A | 5/2000 | Simpson | |
| 6,088,682 A | 7/2000 | Burke | |
| 6,112,191 A | 8/2000 | Burke | |
| 6,164,533 A | 12/2000 | Barton | |
| 6,912,509 B1 * | 6/2005 | Lear | G06Q 40/04 |
| | | | 705/36 R |
| 6,941,279 B1 | 9/2005 | Sullivan | |
| 7,028,827 B1 | 4/2006 | Molbak et al. | |
| 7,407,436 B2 * | 8/2008 | Groz | G07F 17/00 |
| | | | 463/17 |
| D580,941 S | 11/2008 | Scott et al. | |
| D591,304 S | 4/2009 | Banks et al. | |
| 7,574,403 B2 | 8/2009 | Webb et al. | |
| D600,248 S | 9/2009 | Scalisi et al. | |
| D605,653 S | 12/2009 | Danton | |
| D612,860 S | 3/2010 | Tarara et al. | |
| 7,765,147 B2 * | 7/2010 | Khoury | G06Q 30/0605 |
| | | | 705/37 |
| D621,850 S | 8/2010 | Tarara et al. | |
| 7,831,494 B2 | 11/2010 | Sloan et al. | |
| D656,503 S | 3/2012 | Brierley et al. | |
| 8,255,329 B1 | 8/2012 | Barth et al. | |
| 8,301,530 B2 | 10/2012 | Carretta et al. | |
| 8,416,924 B1 * | 4/2013 | Barth | G06Q 40/02 |
| | | | 379/35 |
| 8,676,659 B1 * | 3/2014 | Shnowske | G06Q 30/00 |
| | | | 705/26.1 |
| 8,781,906 B2 * | 7/2014 | Cruttenden | G06Q 40/06 |
| | | | 705/21 |
| D736,238 S | 8/2015 | Kim | |
| D749,113 S | 2/2016 | Zuckerberg et al. | |
| D751,086 S | 3/2016 | Winther et al. | |
| D753,130 S | 4/2016 | Sakhai et al. | |
| D757,744 S | 5/2016 | Kim et al. | |
| D759,696 S | 6/2016 | Binder et al. | |
| D761,294 S | 7/2016 | Weeresinghe | |
| D764,512 S | 8/2016 | McNeil et al. | |
| D771,672 S | 11/2016 | Tanabe et al. | |
| 9,495,708 B2 | 11/2016 | Martell et al. | |
| 9,495,829 B2 * | 11/2016 | Lutnick | G06Q 20/202 |
| D775,632 S | 1/2017 | Van Den Berg et al. | |
| D777,754 S | 1/2017 | Binder et al. | |
| D780,191 S | 2/2017 | Kelley | |
| D780,781 S | 3/2017 | Ding et al. | |
| D781,899 S | 3/2017 | Akana et al. | |
| D784,379 S | 4/2017 | Pigg et al. | |
| D784,381 S | 4/2017 | McConnell et al. | |
| D786,890 S | 5/2017 | Kohan et al. | |
| D789,389 S | 6/2017 | Kim et al. | |
| D795,891 S | 8/2017 | Kohan et al. | |
| D797,768 S | 9/2017 | Shewman | |
| D799,504 S | 10/2017 | Chen et al. | |
| D800,148 S | 10/2017 | Conn | |
| D801,373 S | 10/2017 | Vaglio et al. | |
| D811,426 S | 2/2018 | Trahan et al. | |
| D812,091 S | 3/2018 | Van Every et al. | |
| D815,109 S | 4/2018 | Weaver et al. | |
| D822,692 S | 7/2018 | Loychik et al. | |
| D822,702 S | 7/2018 | Gandhi et al. | |
| D829,113 S | 9/2018 | Read et al. | |
| D831,671 S | 10/2018 | Laing et al. | |
| D831,690 S | 10/2018 | Lewis et al. | |
| D835,134 S | 12/2018 | Tang et al. | |
| D837,248 S | 1/2019 | Boyer et al. | |
| D837,249 S | 1/2019 | Barthold et al. | |
| D838,732 S | 1/2019 | Furdei et al. | |
| D839,296 S | 1/2019 | Sanchez et al. | |
| 10,192,271 B2 | 1/2019 | Martell et al. | |
| D843,401 S | 3/2019 | Spector | |
| D845,318 S | 4/2019 | Malik et al. | |
| D845,988 S | 4/2019 | Alexander | |
| 1,027,557 A1 | 4/2019 | Norton et al. | |
| D850,466 S | 6/2019 | Ari et al. | |
| D854,559 S | 7/2019 | Dudey | |
| 2002/0062272 A1 * | 5/2002 | Kim | G06Q 40/06 |
| | | | 705/36 R |
| 2002/0123954 A1 | 9/2002 | Hito | |
| 2003/0093353 A1 | 5/2003 | Ward et al. | |
| 2003/0125108 A1 * | 7/2003 | Groz | G06Q 30/0212 |
| | | | 463/25 |
| 2003/0149629 A1 | 8/2003 | Claridge et al. | |
| 2003/0225649 A1 | 12/2003 | Simpson | |
| 2004/0222285 A1 | 11/2004 | Pohl | |
| 2004/0243498 A1 | 12/2004 | Duke | |
| 2006/0014579 A1 * | 1/2006 | Kane | G07F 17/32 |
| | | | 463/17 |
| 2006/0036523 A1 | 2/2006 | Stover et al. | |
| 2006/0047589 A1 | 3/2006 | Grau | |
| 2007/0011089 A1 | 1/2007 | Deschryver | |
| 2007/0094130 A1 | 4/2007 | Burke | |
| 2007/0167219 A1 * | 7/2007 | Groz | G07F 17/3258 |
| | | | 463/25 |
| 2008/0027880 A1 * | 1/2008 | Yu | A63F 13/10 |
| | | | 705/36 R |
| 2008/0065532 A1 | 3/2008 | De La Motte | |
| 2008/0167965 A1 | 7/2008 | Von Nothaus et al. | |
| 2008/0255951 A1 | 10/2008 | Miller et al. | |
| 2009/0011397 A1 * | 1/2009 | Writer | G09B 5/00 |
| | | | 434/350 |
| 2009/0089104 A1 | 4/2009 | Kondaks | |
| 2009/0150286 A1 * | 6/2009 | Barton | G06Q 20/40 |
| | | | 705/44 |
| 2009/0181777 A1 * | 7/2009 | Christiani | G07F 17/3288 |
| | | | 463/42 |
| 2009/0204503 A1 | 8/2009 | Hursta | |

(56) References Cited

U.S. PATENT DOCUMENTS

| | | | |
|---|---|---|---|
| 2009/0204528 A1* | 8/2009 | Moses | G06Q 40/00 705/35 |
| 2009/0215537 A1* | 8/2009 | Poff | G07F 17/3288 463/42 |
| 2009/0318220 A1* | 12/2009 | Arezina | G07F 17/32 463/25 |
| 2010/0005034 A1 | 1/2010 | Carpenter et al. | |
| 2010/0005035 A1 | 1/2010 | Carpenter et al. | |
| 2010/0121723 A1 | 5/2010 | Miller et al. | |
| 2010/0124986 A1* | 5/2010 | Van Luchene | A63F 13/80 463/25 |
| 2010/0250436 A1* | 9/2010 | Loevenguth | G06Q 20/40 705/44 |
| 2011/0125637 A1 | 5/2011 | Kalra et al. | |
| 2011/0307318 A1 | 12/2011 | Laporte et al. | |
| 2012/0123849 A1 | 5/2012 | Armstrong | |
| 2012/0173454 A1 | 7/2012 | Shah et al. | |
| 2012/0231878 A1* | 9/2012 | Angelo | G07F 17/329 463/27 |
| 2012/0233089 A1 | 9/2012 | Calman et al. | |
| 2012/0233090 A1 | 9/2012 | Tavares et al. | |
| 2013/0013530 A1* | 1/2013 | Nowacki | G06Q 40/06 705/36 R |
| 2013/0138577 A1 | 5/2013 | Sisk | |
| 2013/0143670 A1* | 6/2013 | Junkin | A63F 13/85 463/42 |
| 2013/0187780 A1 | 7/2013 | Angelides | |
| 2013/0191196 A1* | 7/2013 | Cecala | G06Q 30/0279 705/14.17 |
| 2013/0332388 A1 | 12/2013 | Martell et al. | |
| 2013/0332850 A1 | 12/2013 | Bovet et al. | |
| 2014/0121013 A1 | 5/2014 | Carson et al. | |
| 2015/0081458 A1 | 3/2015 | Cruttenden et al. | |
| 2015/0350861 A1 | 12/2015 | Soli et al. | |
| 2016/0292663 A1 | 10/2016 | Sagan et al. | |
| 2016/0314432 A1 | 10/2016 | Bhatti | |
| 2016/0342151 A1 | 11/2016 | Dey, IV et al. | |
| 2016/0364687 A1 | 12/2016 | Matson et al. | |
| 2017/0024091 A1 | 1/2017 | Hosier, Jr. | |
| 2017/0092068 A1 | 3/2017 | Vann | |
| 2017/0123390 A1 | 5/2017 | Barco et al. | |
| 2017/0134878 A1 | 5/2017 | Loychik et al. | |
| 2017/0154491 A1 | 6/2017 | Harvie et al. | |
| 2017/0186074 A1 | 6/2017 | Lee et al. | |
| 2017/0286061 A1 | 10/2017 | Tamai et al. | |
| 2018/0337918 A1 | 11/2018 | Chang et al. | |
| 2019/0012734 A1 | 1/2019 | Cruttenden et al. | |
| 2019/0079665 A1 | 3/2019 | Xian et al. | |
| 2019/0147841 A1 | 5/2019 | Zatepyakin et al. | |

OTHER PUBLICATIONS

Babich. Basic Patterns of Mobile Navigation. Adobe Blog, published May 9, 2017 (Retrieved from the Internet Aug. 15, 2019). Internet URL:< https://theblog.adobe.com/basic-patterns-of-mobile-navigation/ (2pgs.) (2017).

Chepa. Google Testing A Colorless Shapless Play Store Redesign . . . Chepa.net, published Feb. 23, 2018 (Retrieved from the Internet Aug. 14, 2019). Internet URL:< http://chepa.net/a11/2018/02/23/ google-testing-a-colorless-shapeless-play-store-redesign-with-large-install-button/> (4 pgs.) (2018).

Schade et al. 4 iOS Rules to Break. Nielsen Norman Group, published Jul. 19, 2015 (Retrieved from the Internet Aug. 13, 2019). Internet URL:< https://www.nngroup.conn/articles/4-ios-rules-break/> (5 pgs.) (2015).

Sinclair. Blast seeks to gamify savings. GamesIndustry.biz, published Mar. 12, 2018 (Retrieved from the Internet Aug. 13, 2019). Internet URL:< https://www.gannesindustry.biz/articles/2018-03-12-blast-seeks-to-gannify-savings> (2 pgs.) (2018).

U.S. Appl. No. 29/646,934 Office Action dated Aug. 20, 2019.
U.S. Appl. No. 29/646,937 Office Action dated Aug. 20, 2019.
U.S. Appl. No. 29/656,938 Office Action dated Aug. 20, 2019.
U.S. Appl. No. 29/656,941 Ex Parte Quayle dated Aug. 22, 2019.

Ved. Interaction Design Patterns: iOS vs Android. Medium, published Apr. 14, 2017 (Retrieved from the Internet Aug. 14, 2019). Internet URL:< https://nnediunn.conn/@vedantha/interaction-design-patterns-ios-vs-android-111055f8a967> (2 pgs.) (2017).

Acorns App Wants to Invest Your Spare Change [online]. Direkt Concept. pp. 1-2. Jun. 18, 2014. [retrieved on Mar. 15, 2016]. Retrieved from the Internet. «http://www.direktconcept.com/2014/06/18/acorns-app-wants-to-invest-spare-change/».

Acorns Is a Micro-Investment App That Does All the Thinking for You [online]. Techcrunch, Aug 26, 2014. [retrieved on Mar. 15, 2016]. pp. 1-6. Retrieved from the Internet. «http://techcrunch.com/2014/08/26/acorns-is-a-micro-investment-app-that-does-all-the-thinking-for-you/».

Acorns Review [online]. 148Apps, Oct. 6th, 2014 [retrieved on Mar. 15, 2016]. pp. 1-18. Retrieved from the Internet.<< http://www.148apps.com/reviews/acorns-review-3/».

Bank of America introduces first-ever keep the change(TM) electronic change jar to help consumers save while they spend. (Oct. 5, 2005). PR Newswire Retrieved from https://dilog.proquest.conn/professionl/docview/674805611?ccountid=142257 (3 pgs.).

Coinstar launches 'most generous city in america' challenge this halloween on behalf of trick or treat for UNICEF's 50th anniversry. (Oct. 3, 2000). PR Newswire Retrieved from https://dilog.proquest.conn/professionl/docview/672629658?ccountid=142257 (3 pgs.).

Co-pending U.S. Appl. No. 29/656,934, filed Jul. 17, 2018.
Co-pending U.S. Appl. No. 29/656,937, filed Jul. 17, 2018.
Co-pending U.S. Appl. No. 29/656,938, filed Jul. 17, 2018.
Co-pending U.S. Appl. No. 29/656,941, filed Jul. 17, 2018.
Co-pending U.S. Appl. No. 29/659,119, filed Aug. 6, 2018.
Co-Pending U.S. Appl. No. 29/659,120, filed Aug. 6, 2018.
Co-Pending U.S. Appl. No. 29/659,121, filed Aug. 13, 2018.
Co-Pending U.S. Appl. No. 29/659,124, filed Aug. 6, 2018.

Newsweek: Cover story: 'technology: What you'll want next'. PR Newswire Retrieved from http://search.proquest.com/docview/449709031?accountid=14753 retrieved on Mar. 29, 2016 (May 23, 1999).

PCT/US2018/041311 International Search Report and Written Opinion dated Sep. 19, 2018.

Symons. Making the connection through technology. Drug Store News, 20(20), 57-57, 107+. Retrieved from http://search.proquest.com/docview/204728199?accountid=14753 retrieved on Mar. 29, 2016 (1998).

U.S. Appl. No. 13/494,003 Office Action dated Jun. 26, 2014.
U.S. Appl. No. 13/494,003 Office Action dated May 5, 2015.
U.S. Appl. No. 13/494,003 Office Action dated Oct. 25, 2013.
U.S. Appl. No. 13/494,003 Office Action dated Oct. 9, 2015.

Chepa. Update Once More Google Testing A Colorless Shapeless, Chepa.net, Feb 14, 2018 [online], site visited Nov. 6, 2019. Available form Internet at URL: http://chepa.net/a11/2018/11/28/update-once-more-google-testing-a-colorless-shapeless-play-store-redesign-with-large-install-button/(2018).

U.S. Appl. No. 29/659,120 Office Action dated Nov. 12, 2019.
U.S. Appl. No. 29/659,121 Office Action dated Nov. 12, 2019.

* cited by examiner

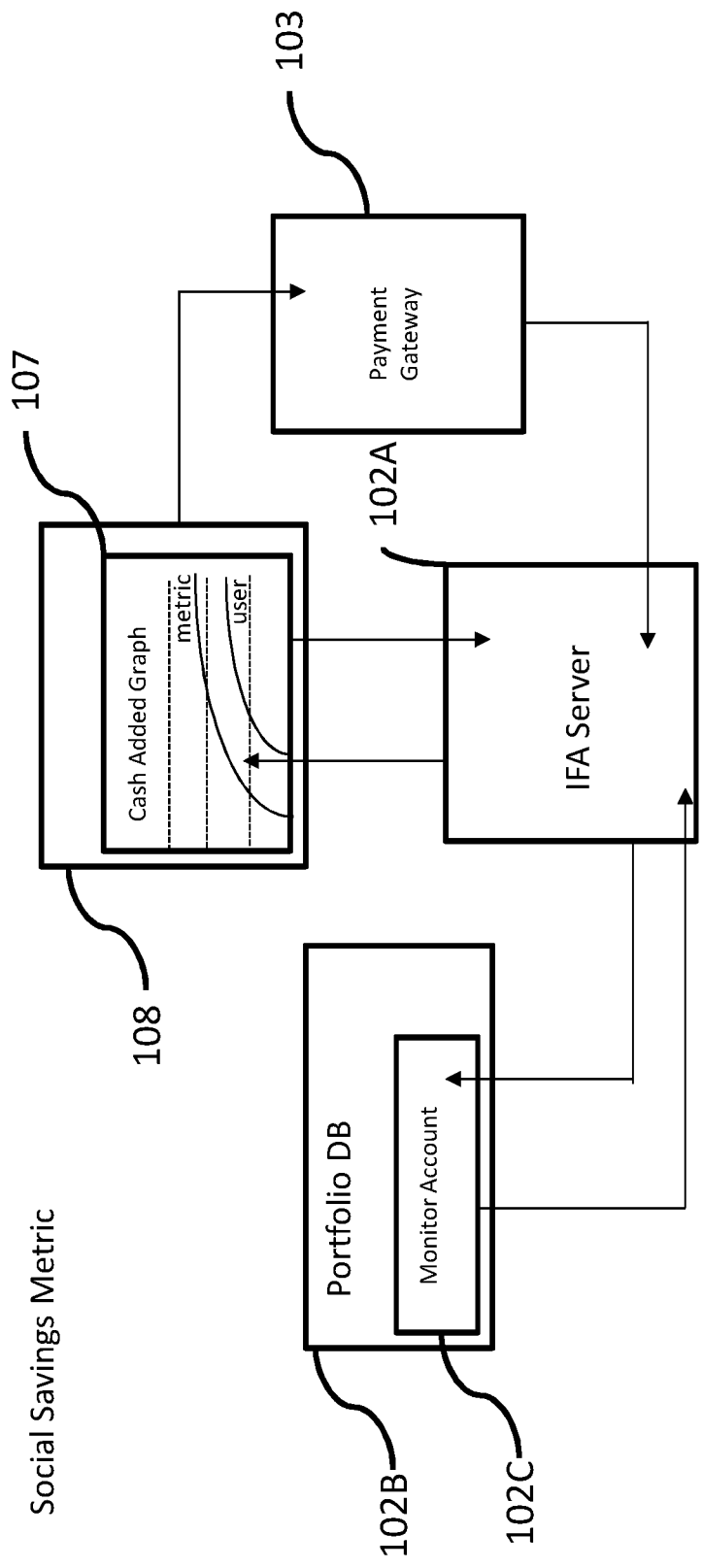

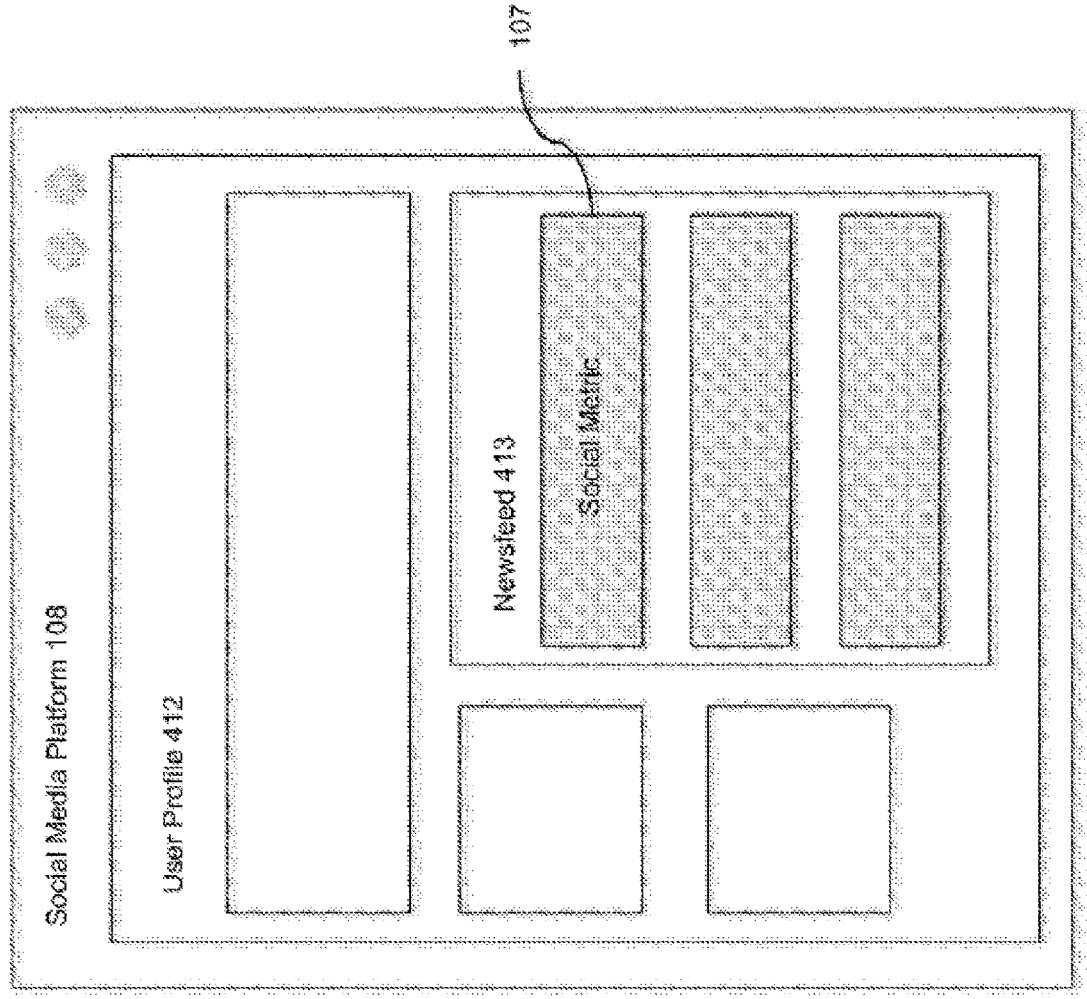

SYSTEMS AND METHODS FOR MANAGING ELECTRONIC INTERACTIVE GAMING-BASED INVESTMENTS

CROSS-REFERENCE

The application is a continuation of U.S. application Ser. No. 15/197,249, filed Jun. 29, 2016, which is a continuation of U.S. patent application Ser. No. 13/494,003, filed Jun. 11, 2012, the contents of which are hereby incorporated by reference in their entirety.

FIELD OF THE INVENTION

The field of the invention relates to systems and methods for controlling investment funds, and more particularly to systems and methods for facilitating investments through interactive electronic gaming, such as by redirecting electronic commerce transactions from social/gaming networks.

BACKGROUND OF THE INVENTION

A variety of financial investment programs exist to facilitate protecting consumer assets. Among these programs, long-term investment plans allow consumers/employees/users to save for their future/retirement within an expected period of time When used correctly, these programs promote not only economic growth but also personal financial safety. Investing resources provides fixed capital (e.g., land, buildings, equipment) for the economy and potential gain for the investor. The most effective long-term investments bear low risks and offer high profits. These investments minimize the effect of market fluctuations and other risks to maximize the expected return.

Unfortunately, despite the potential reward of investing and risk-aversion techniques, many employees fail to establish any long-term investment plan at all. In some cases, these investment programs are not always available to a large portion of the population. Even where available, many employees/consumers lack the motivation to invest over a long period of time because it is difficult to visualize a high-expected return without sufficient investment expertise. Accordingly, transactions costs (e.g., fees, commission, and so on) are high and employees/consumers/users often are unwilling to accept the risk of investment for an unknown reward.

Related to investment programs, some consumers choose savings to preserve their income. Savings are defined as income not spent (i.e., deferred consumption) such as, for example, money put aside in a bank. This also includes reducing expenses. Savings are relatively accessible to a larger group of users than most investments. A deposit account paying interest is often used to hold money for future needs. Typically, conventional saving methods earn low, fixed rates and present correspondingly lower risks than investments. It is possible to invest resources not spent as previously discussed; however, increased saving does not always correspond to increased investment. Nevertheless, consumers must still rely on self-discipline to save.

One method for encouraging financial asset protection provides real-time investment projections during the consumer transaction process. An example is disclosed in a co-pending U.S. patent application Ser. No. 13/366,499, filed Feb. 6, 2012, by the same inventor and assigned to the same assignee of the instant application, which is hereby incorporated by reference in its entirety. This approach pushes real-time investment data to a consumer based on a portion of their traditional consumer transactions. Having this immediate knowledge creates a *nexus* between savings/investments and consumer transactions, thereby motivating consumers to realize their long-term investment goals.

In addition to providing immediate knowledge of investment benefits (i.e., pushing potential investment benefits in real-time), competition is also an effective catalyst for allocating consumer finances. For example, purchasing tickets for a raffle, betting on a race, entering a tournament, and so on introduces a component of competition that encourages consumers to spend their funds in return for the opportunity to compete and win. Access to competitive activities has expanded into Web-based environments. In fact, with the proliferation of online gaming, an increasing number of consumers have immediate access to spend funds and "play" without leaving their computer.

Social networking systems—for instance, Face-book®, MySpace®, Twitter®, LinkedIn®, and so on—provides both a platform for online competition and a ready pool of consumers to participate. FarmVille, Poker, and CasteVille from Zynga, Inc.® in San Francisco, Calif. are only a few examples of Facebook® applications that allow its members to play over the social network. In many of these applications, players can acquire virtual currency (e.g., points, coins, and so on) to be spent in the game, often through the exchange of actual funds (i.e., cash/credit). For example, FarmVille allows players to cultivate and care for virtual farms and animals. Each player has the option to interact (e.g., exchange goods, visit other farms, exchange services) with neighboring farmlands, owned by other members of the social network. Farm Cash and Farm Coins are available for purchase and can be used during gameplay to harvest crops, purchase farm items (e.g., buildings, trees, animals), plow land, and so on. Farm Cash and Farm Coins cannot be exchanged for actual currency; therefore, exchanging actual funds for virtual currency is a one-way transaction that minimally benefits the player. Nevertheless, players are motivated to spend their actual funds for a chance to build a thriving virtual farm.

In another example, interactive online Poker allows players to meet other social members and play a number of card games. Actually currency can be similarly exchanged for virtual credits during the game. For a number of online interactive games, the winner is often determined by chance (e.g., rolling dice, collecting various items) and, in cases where virtual currency has cash value, actual consumer funds are lost. A user's wins, losses, and virtual currency are maintained throughout the system.

Online gaming attracts participants through reward-based incentives similar to investments. As previously discussed, effective long-term investments bear low risks and offer high profits. Investments generally bear a high security of return within an expected period of time from a thorough analysis of the risk of loss. Online gamers spend funds and play games in search of a similar reward/return. However, unlike investments, online gaming often involves a risk of loss that exceeds the expected return. Competition may drive users to accept this risk based on chance without thorough analysis. Consumers failing to differentiate the risk associated with both investment returns and online gaming rewards may not realize their financial goals. Instead, actual funds may be put at risk and lost to online competition.

Current online gaming applications are effective for introducing a component of competition to encourage users to spend their funds. Unfortunately, risk management concepts involving conventional online gaming fail to promote higher returns and economic growth, such as those associated with long-term investments. Current gaming applications rarely provide the *nexus* between online gaming and savings/investments in order to encourage users to protect their assets through competition and performance metrics (e.g., investment projections). Accordingly, an improved system and method for encouraging/facilitating investments/savings through competitive incentives is desirable.

SUMMARY OF THE INVENTION

The field of the invention relates to systems and methods for controlling investment funds, and more particularly to systems and methods for facilitating investments through interactive electronic gaming. In one embodiment, an interactive electronic gaming system may include a game server for hosting a Web application game. The system further includes one or more client communication devices configured to access the game server over a data network. The game server is configured to intercept any electronic payment transactions over a payment gateway server through the Web application game over the data network. An index fund system is accessible over said data network for maintaining electronic investment portfolios. The game server is operatively coupled to a computer program product, the computer program product having a computer-usable medium including a sequence of instructions which, when executed by a processor, causes said processor to execute a process that creates investment projections based on the intercepted payment transaction and redirects electronic transfers to a portfolio database.

The process includes the steps of hosting a game at the game server; intercepting a transaction through the payment gateway server, the transaction having a first numerical amount of electronic funds to be exchanged for virtual currency; computing an expected return, wherein the return is based on the investment of the first numerical amount of electronic funds; electronically publishing the expected return to the client communication device; and electronically transferring the first numerical amount to the portfolio server over said data network in exchange for virtual currency to be used during said game. In an alternative embodiment, the process further includes the step of publishing investment performance metrics to said game server over said data network, wherein said investment performance metrics compare the performance of a user to other users of said game.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 4*a* is a functional block diagram of a published social metric in accordance with a preferred embodiment of the present invention;

FIG. 4*b* is a sample screenshot of a published investment performance metric on a social media platform.

DETAILED DESCRIPTION OF THE PREFERED EMBODIMENTS

Figure 1:
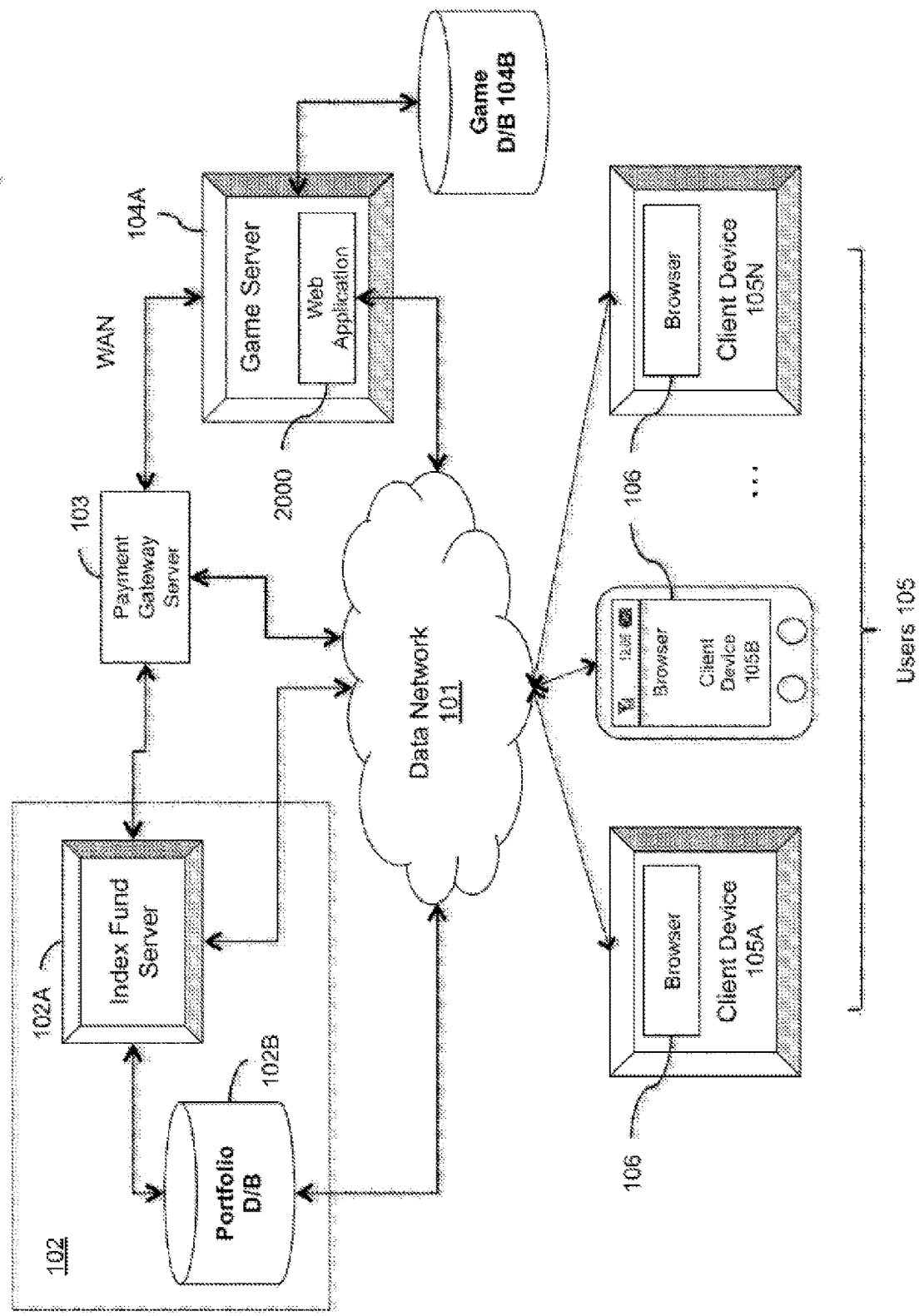
FIG. 1 is a schematic diagram of a network environment in accordance with a preferred embodiment of the present invention.

As described above, competition is an effective catalyst for allocating consumer finances. Turning to FIG. 1, an exemplary online gaming system 100 that facilitates long-term financial investments during interactive gaming is further illustrated in block-diagram form. The system 100 includes an Index Fund System 102 having an index fund server 102A controlling access to a portfolio database 102B. Portfolio database 102B stores electronic files representing financial investment fund account information for users 105, including both individual and collective investment funds. In one embodiment, portfolio database 102B represents a collective investment scheme, such as storing various index funds.

As an example of a collective investment scheme, Index Funds Advisors (IFA) offer 100 Index Portfolios, which are individualized and indexed funds to replicate the movement of an index of a specific financial market. Alternatively, portfolio database 102B may represent other investment schemes, such as, social conscious funds, exchange-traded funds (ETF), mutual funds, fund of funds (FOF), pre-constructed portfolios, and so on. User input from users 105 may also specify a particular scheme for storage.

As one of ordinary skill in the art would appreciate, portfolio database 102B may be any type of storage device or storage medium such as hard disks, cloud storage, CD-ROMs, flash memory, DRAM and may also include a collection of devices (e.g., Redundant Array of Independent Disks ("RAID")). Similarly, it should be understood that Index Fund Server 102A and portfolio database 102B could reside on the same computing device or on different computing devices. The information from database 102B can be accessed over a data network 101, through respective network connections, represented as solid lines in FIG. 1. These network connections are wired or wireless and are implemented using any known protocol.

Data network 101 is a set of hardware, software, and protocols that is configured for electronic communication. For example, network 101 may be any one of a global data network (e.g., the Internet), a regional data network, mobile/cellular wireless network, or a local area network. In a preferred embodiment, data network 101 represents a packet-switched network for routing various data. The network 101 uses common high-level protocols, such as TCP/

IP and may comprise multiple networks of differing protocols connected through appropriate gateways.

The system 100 further includes a game server 104A communicatively linked such as through a Wide Area Network (WAN) to a payment gateway server 103. It should also be understood that game server 104A and payment gateway server 103 could reside on the same computing device or on different computing devices. The game server 104A further includes a game database 104B for storing user profiles (e.g., for users 105), game metrics (e.g., wins/losses, progress, history), in-game variables (e.g., tokens, coins, virtual currency), and so on. Game server 104A is also configured to host a Web application 2000, such as an online interactive game, stored in game database 104B.

For illustration purposes, game server 104A is discussed as a social networking platform accessible in a variety of network configurations. Examples of known social networking platforms include, but are not limited to, Face-book®, Twitter®, LinkedIn®, and MySpace®; however, game server 104A may also represent a stand-alone system or any similar online gaming platform or telecommunications network. Accordingly, Web application 2000 represents a software application accessible through the social networking platform for members of the social network. However, Web application 2000 can also be a stand-alone software game or application that provides an interface to a third-party game. Examples of stand-alone gaming systems include Sony®, Microsoft®, Nintendo®, and Sega® gaming systems.

In yet another alternative embodiment, game server 104A includes stand-alone kiosks having hardware to receive financial deposits (i.e., electronic payments and physical currency) from users 105. For example, game server 104A may represent, without limitation, slot machines, video arcades, and coin sorting and counting machine. Accordingly, Web application 2000 represents a software application directly accessible to perform casino gaming, video gaming, and currency collection functions, respectively. Typically, coin sorting/counting machines convert loose change into paper currency, donations or gift cards for a nominal fee or percentage. Additional information for the operation of coin-counting kiosks is disclosed in U.S. Pat. No. 7,028,827, filed Aug. 12, 1996, by Molbak et al., to Coinstar, Inc., for a "Coin Counter/Sorter and Coupon-Noucher Dispensing Machine and Method," which is hereby incorporated by reference in its entirety.

One or more users 105 connect to game server 104A over data network 101. In one embodiment, users 105 access the gaming server 104A using client devices 105A, 105B, and 105N, each having a processor and storage medium (not shown). Devices 105A, 105B, and 105N are preferably portable communication devices, such as mobile phones, laptop computers, personal digital assistants (PDA), and portable multimedia players. However, devices 105A, 105B, and 105N also include laptops, desktops, multiprocessor systems, microprocessor-based systems, programmable consumer electronics, telephony systems, distributed computing environments, set top boxes, gaming systems, and so on. Devices 105A, 105B, and 105N may further include a user interface console, such as a touch screen monitor (not shown), to allow the user/consumer to provide input to the game (e.g., game commands through direction buttons, keyboards, dials, joysticks, and so on). For example, a player in the game can move based on direction controls/buttons. The user interface console is also configured to preset various system parameters. User defined system parameters may include, but are not limited to, investment metrics, payment information, investment variables, game controls, and external application accessibility. Client devices 105A, 105B, and 105N are configured to run a Web browser 106 to allow users 105 to connect to the data network 101, such as to game server 104A over the Internet. Web browsers 106 are special-purpose application programs for accessing, viewing, and traversing information resources on the Web, as is well understood and appreciated.

Alternatively, for game server 104A representing stand-alone kiosks (e.g., slot machines and coin sorting and counting machine) discussed above, one or more users 105 access game server 104A directly. This allows users to directly deposit physical funds (e.g., cash) to be converted to an electronic payment prior to transmission over data network 101. For example, users 105 may play slot machines in a casino and physically deposit cash to be used during game-play.

In order to play an online interactive game, users 105 access game server 104A, which provides one or more games in operation, such as Web application 2000. Data from Web application 2000 is transmitted to client devices 105A, 105B, and 105N (e.g., effected by Web browser 106) over data network 101. Similarly, users 105 may also access game server 104A without client devices 105A, 105B, and 105N (e.g., casino slot machines, coin counting machines, and so on). In a preferred embodiment, gameplay of Web application 2000 allows users 105 to cultivate virtual tree groves and/or forests. Users 105 plant and care for trees in exchange for virtual currency (e.g., virtual "acorns"). In an alternative embodiment, gameplay of Web application 2000 allows users 105 to "collect" or "capture" virtual currency. This interactive approach encourages users to play a game where the objective is to collect as many virtual coins as possible.

As previously mentioned, for interactive gaming Web applications 2000 that allow players to purchase virtual currency, the outcome of the game often involves a risk of loss that exceeds the expected return. In many cases, players pay an entry fee to participate in the game or purchase in-game credits for use during the game. This virtual currency is acquired through exchanging actual funds; however, actual funds typically are not returned for virtual currency. Accordingly, purchasing virtual currency is a one-way transaction that only benefits the player during the game. The competition of the online gaming application encourages users to spend their funds without actionable knowledge regarding this one-way exchange. As a result, players may not have an effective appreciation of these funds and often forego other opportunities to save their money/earn rewards (e.g., long-term investments) for a fleeting virtual benefit.

Figure 2:
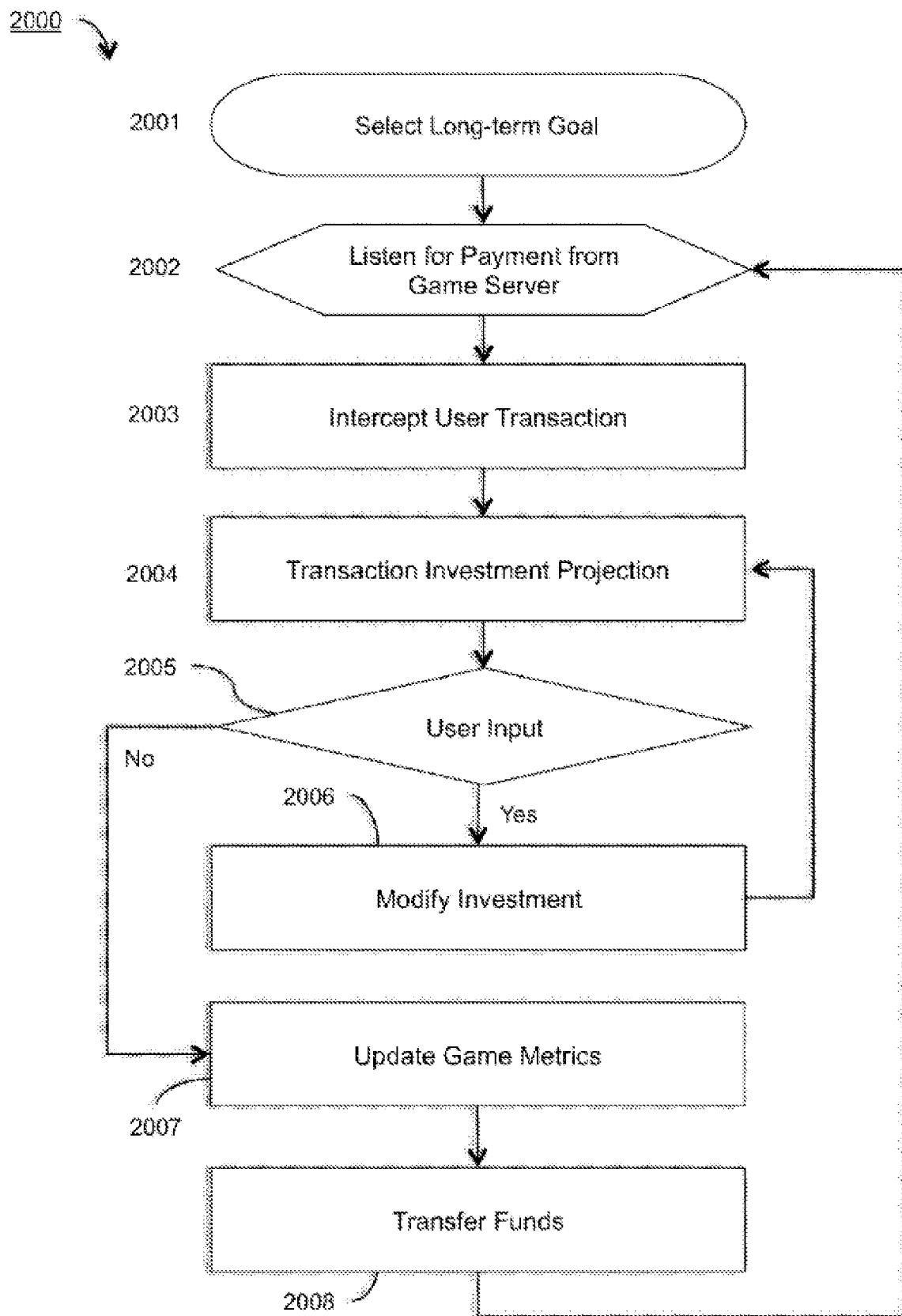
FIG. 2 is a flowchart of a process in accordance with a preferred embodiment of the present invention.

One approach to address this issue is illustrated in FIG. 2, which illustrates a process 2000 that may be executed within game server 104A (e.g., as Web application 2000). Process 2000 may consist of various program modules including routines, scripts, programs, objects, components, data structures, threads and so on that perform particular tasks or implement particular abstract data types. The program modules can be commercially available software tools using custom object-oriented code or discrete electrical components as integrated circuits. In a distributed computing environment, these modules are located in both local and remote storage devices including memory storage devices.

In a preferred embodiment, once users 105 begin an interactive online game session on their client device 105A, 105B, and 105N, an option is provided for users 105 to select from a list of long-term financial goals (start block 2001). These long-term goals include, without limitation, savings for purchasing homes, vacation homes, cars, retirement funds, college funds, luxury items, and so on. After users 105 select one or more of these goals, this information is stored in game database 104B in association with the respective user 105 profile (e.g., associated maps).

Subsequently, similar to conventional online games, users 105 then have the option to purchase virtual game credits using actual funds. Game credits include virtual tokens, coins, and so on that can be exchanged in game operation for various game assets. Similarly, actual funds include, without limitation, cash, rebates, reward points, credit, and so on. Online account-based systems such as those available from PayPal and Google allow users to securely transfer electronic payments from numerous financial accounts. Users 105 can transmit electronic payment information using client devices 105A, 105B, and 105N over data network 101 to game server 104A through respective network connections, represented as solid lines in FIG. 1. These network connections are wired or wireless and are implemented using any known protocol. Similarly, users 105 may also directly deposit actual funds to game server 104A. Electronic payment gateways are created upon transmission of payment information to payment gateway server 103 over data network 101, for example, via the Internet. As those of ordinary skill in the art would appreciate, payment gateways are application service providers to process and authorize the payment information.

Figure 3A:
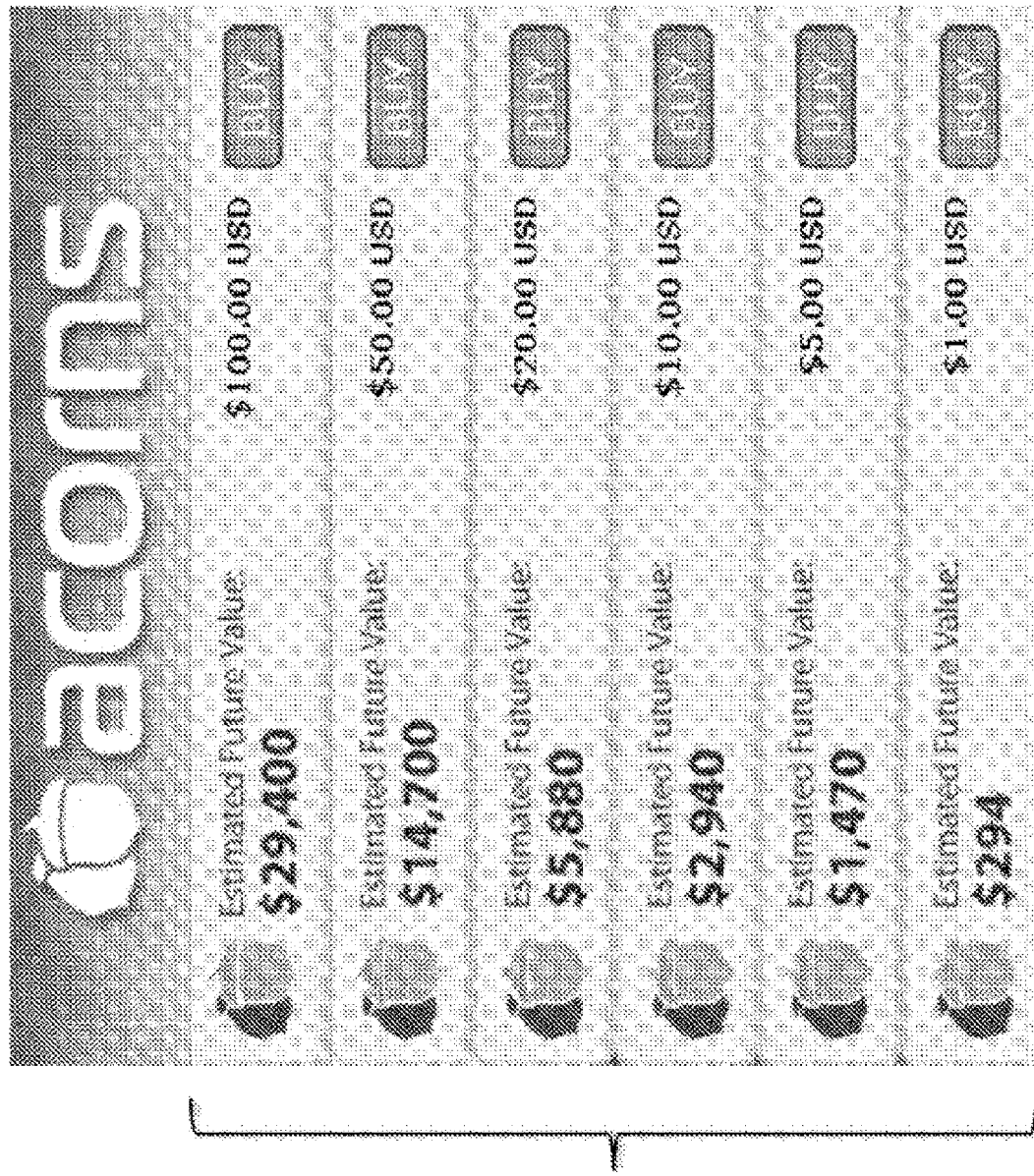
FIG. 3*a* is a sample screenshot of a virtual cash transaction from a consumer device.

Turning to FIG. 3a, a sample screenshot 300 of this purchase option is shown. As illustrated, users 105 have several options 301 to exchange actual funds (i.e., dollars, reward points, credit) for virtual cash (i.e., "acorns"). For each purchase option, an estimated future value is shown for possible returns based on a long-term investment of the purchase amount, which will be further discussed below with reference to action block 2004. A variety of credit and electronic payment options are provided to effect this transfer. Electronic payment gateways 103 facilitate the transfer of payment information between client devices 105A, 105B, and 105N and game server 104A.

Returning to FIG. 2, process 2000 listens for any transaction done through an approved gateway (listening block 2002) to intercept the transmitted information (action block 2003). Instead of immediately forfeiting this electronic payment in a one-way exchange for virtual currency, this transmitted payment information is eligible for electronic transfer into a high performance investment fund. Therefore, users 105—driven by competition will have the option to determine the best method for allocating these actual funds and continue to play the game without losing any assets. In one embodiment, users 105 authorize process 2000 to intercept payment information from client device 105A, 105B, and 105N in real-time, prior to transmission. However, process 2000 may also periodically poll payment gateway server 103 for recent payment transactions. Client/server-based polling in network computing environments is well understood and appreciated.

Once this payment information is intercepted, process 2000 immediately computes a projected return of a long-term investment of the intercepted purchase payment (e.g., a 50-year investment) (action block 2004). In a preferred embodiment, this computation is based on the historical performance of portfolios designed according to Modern Portfolio Theory (MPT). For example, the predicted return may reflect the relative return of similar investments based on composite stock market indices of like companies/sectors (e.g., indices for companies of a certain size, management, and so on). Additional information describing this investment projection computation is disclosed in the previously referenced co-pending U.S. patent application Ser. No. 13/366,499, filed Feb. 6, 2012, by the same inventor and assigned to the same assignee of the instant application.

Figure 3B:
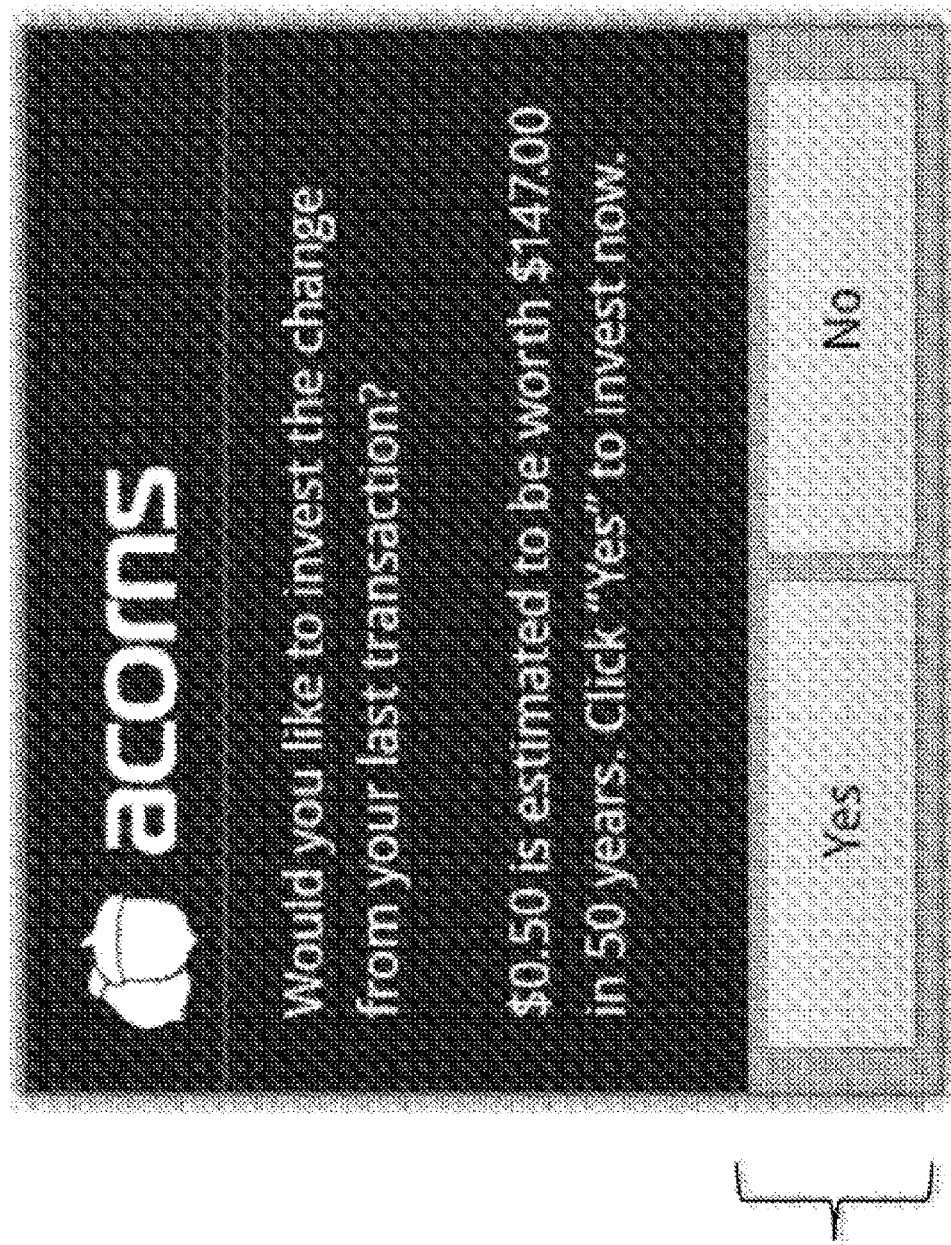
FIG. 3*b* is a sample screenshot of a published computation delivered to a consumer device.

This projected return is immediately published to users 105, such as to client device 105A, 105B, or 105N, e.g., using server push or comparable publish/subscribe-based data network communication. Therefore, users 105 are immediately involved in the application of their possible financial savings. Through projected effects of investment, users 105 have an immediate gauge of personal savings goals to make speedy, and educated, decisions for allocating assets during in-game purchases. An example of this published computation is shown in FIG. 3b. Screenshot 310 illustrates the specific computation for change (i.e., $0.50) invested over 50 years. Options 302 for investing are provided.

Having this actionable knowledge of possible investment returns based on the in-game purchase, educated users 105 subsequently have the option to alter the amount to purchase/invest (decision block 2005). User input to client device 105A, 105B, and 105N is used to adjust the purchase amount. If a user 105 customizes their investment to meet their specific financial goals established in start block 2001 (i.e., increase or decrease the virtual currency amount purchased), the investment value is modified for transfer (action block 2006). A computed long-term investment projection is dynamically updated to reflect the manual entry of the purchase/investment amount (return to action block 2004).

In an alternative embodiment, users 105 are able to allocate a portion of the amount transferred to third-party sources (e.g., charitable donations, alternative investment sources, and so on). Accordingly, a percentage of the funds to be invested is made eligible for alternative financial benefits for users 105.

Returning to process 2000, if the user 105 approves the purchase of virtual currency, the in-game variables and other game metrics are updated as gameplay continues (action block 2007). As an example, in the preferred game described above (i.e., cultivating forests/tree groves), for each long-term goal established in start block 2001, a virtual tree grove or forest represents the user's progress in reaching that goal. Action block 2007 queries portfolio database 102B, which maintains investment fund information for each user 105, to determine the user's actual investment returns (e.g., previously saved game progress). Based on the percentage completed for the currently viewed goal (i.e., any previous investments in addition to the current investment), the number of trees for that grove is updated to reflect the current in-game purchase. Users 105 can also navigate through their forests/groves, in addition to the forests/groves of other social networking members, to view the progress of other long-term goals. As an additional advantage, the use of forests/groves ensures that users 105, without knowledge of financial markets, appreciate the long-term commitment for realizing their financial goals in contrast to a short-term savings plan.

As another example, users 105 playing a slot-machine game can also use the purchased virtual currency to continue gameplay. Each virtual credit may represent a single spin of a slot-machine or other similar game. Alternatively, users 105 can also update their total deposit amount for coin-counting deposits, as described above.

Over the course of time, users 105 can unlock other game-variables based on their progress. For example, shareable "badges" are awarded when users reach certain financial milestones (i.e., progress of their forests). Therefore, a user 105 investing ten times a week may unlock a "badge"

rewarding their frequent purchases. Similar badges can be awarded for reaching various percentages of their goals (e.g., 5%, 10%, 50%, and so on of the savings needed to complete a tree grove). These game variables are updated and stored in game database 104B.

After database 104B is updated, the electronic payment information is transferred to an index fund on behalf of the user 105 (action block 2008). Specifically, game server 104A transfers payment information to Index Fund Server 102 over data network 101. The electronic funds are updated in the users respective account maintained in portfolio database 103. Therefore, compared to a one-way exchange for virtual currency, users 105 do not forfeit any actual funds. Instead, process 2000 provides the advantages of reducing transactions costs for creating investment portfolios and providing the expected future value of the investment. Unlike conventional online gaming, users 105 having actionable knowledge of long-term investment benefits and driven by competition of online gaming can then spend their money to "play" interactive games and receive financial benefits that extend beyond the lifetime of the virtual environment. Funds that may have been lost to online gaming, gambling (e.g., slot machines), or conversion fees (e.g., coin counting machines) are swept into high performance index funds on behalf of users 105. Process 2000 returns to start block 2001 to monitor and intercept the next in-game transaction.

In an alternative embodiment for updating game metrics during gameplay, when a user 105 achieves certain milestones or wishes to share aspects of their financial progress, game server 104A is configured to broadcast a user's 105 investment performance metric to one or more social networking platforms. Turning to FIG. 4a, a functional block diagram 400 for publishing financial metrics is shown. When users 105 transfer funds to their portfolio database 102B via payment gateway 103, the payment gateway 103 updates both the index fund server 102A with the amount to transfer into the user's 105 index fund account 102C. Each transfer may cause a user 105 to reach certain milestones or earn awards during gameplay, which subsequently can be compared to other users 105.

As previously mentioned, game server 104A is discussed as a social networking platform. Accordingly, for each transfer via payment gateway 103, game server 104A also creates investment metrics comparing a user's 105 current savings/investments performance against the savings/investments performance of other users 105. In a preferred embodiment, a graph 107 is used to illustrate the user's 105 performance compared to the average return of other users 105 that started their investment at the same time (e.g., same month or year). It should also be appreciated that graph 107 may similarly include investment progress based on, for example, a specific user's 105 investment performance, in-game variables/awards (e.g., milestone awards, badges, and so on), a specific group of users' 105 investment performance, a global performance rate, and the rates of other similarly situated users 105. This social metric graph 107 can be published on one or more social media platforms 108, such as those represented via game server 104A (e.g., Facebook®, Twitter®, LinkedIn®, MySpace®). With reference to FIG. 4b, a sample screenshot 410 illustrates a user's 105 profile 412 on social media platform 108. When users 105 achieve certain milestones or choose to share aspects of their progress (e.g., from Web application 2000), their investment performance metric 107 can be posted to a newsfeed 413. Users 105 can immediately view this information on client device 105A, 105B, or 105N, e.g., using server push or comparable publish/sub-scribe-based data network communication discussed above. Therefore, users 105 have an immediate gauge of relative investment performance to promote investing assets during in-game purchases.

Figure 5:
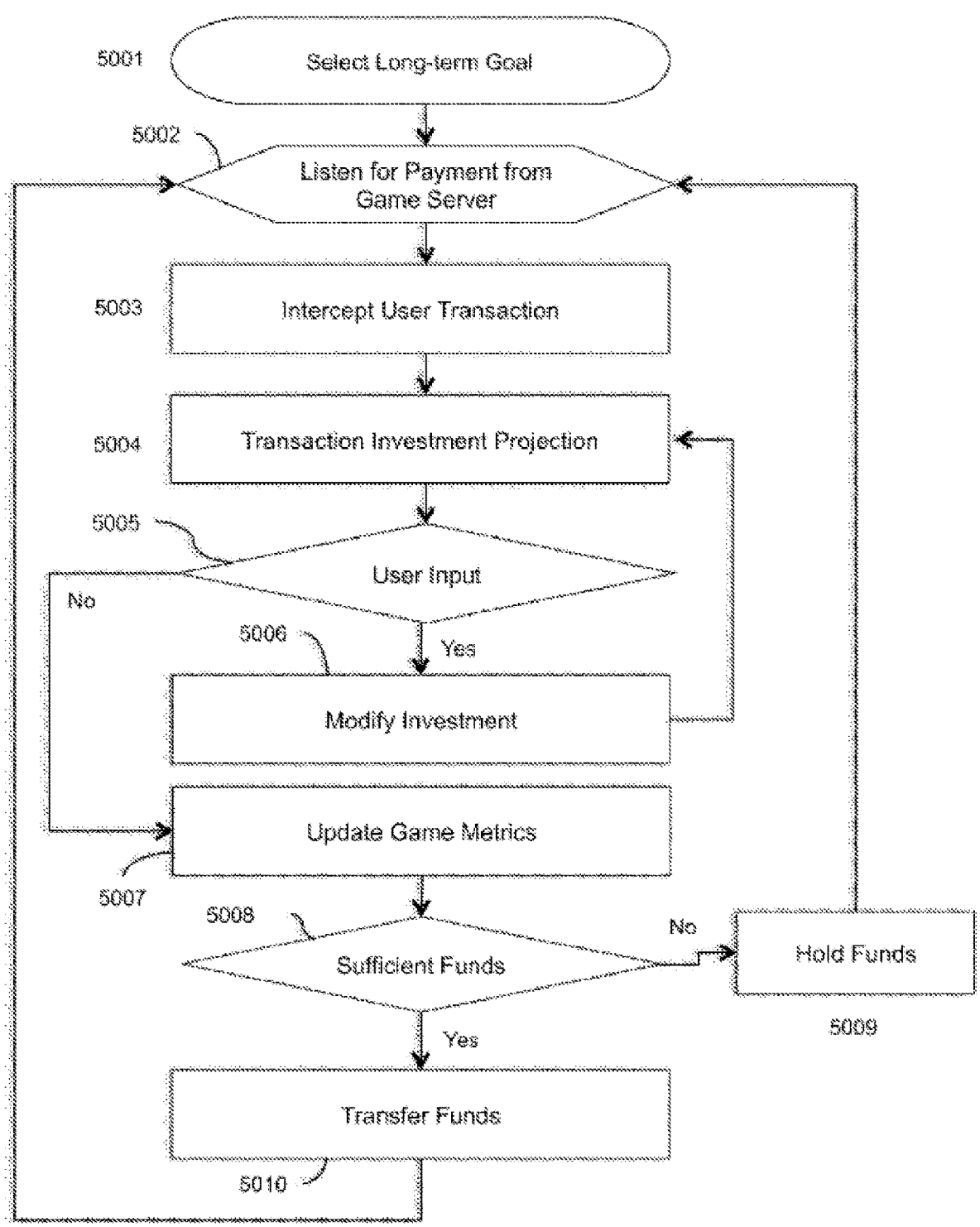
FIG. 5 is another flowchart of a process in accordance with an alternative embodiment of the present invention.

Turning to FIG. 5, another process 5000 that encourages investments/savings through competitive incentives is further illustrated in block-diagram form. Like with process 2000, process 5000 begins when users 105 access an interactive online game session from their client device 105A, 105B, and 105N or directly at game server 104A. An option is provided to select from a list of long-term financial goals (start block 5001), as discussed above. This selection is similarly stored in game database 104B in association with the respective user 105 profile. Subsequently, users 105 are presented with an option to purchase virtual game credits using actual funds.

Like with process 2000, process 5000 monitors any transactions done through an approved gateway (listening block 5002) to intercept the transmitted information (action block 5003). Once this payment information is intercepted, process 5000 immediately computes a projected return of a long-term investment of the intercepted purchase payment (e.g., a 50-year investment) (action block 5004), as discussed in process 2000. This projected return is immediately published to users 105, such as to client device 105A, 105B, or 105N, e.g., using server push or comparable publish/sub-scribe-based data network communication. With this information, users 105 have the option to alter the amount to purchase/invest (decision block 5005). If a user chooses to customize their investment to meet their specific financial goals established in start block 5001 (i.e., increase or decrease the purchase amount), the investment value is modified for transfer (action block 5006), and process 5000 computes an updated investment projection to reflect the manual entry (return to action block 5004). Similar to process 2000, users 105 can optionally allocate a portion of the amount transferred to a third-party source in decision block 5005.

Once the user 105 approves the purchase of virtual currency, the in-game variables and other game metrics are updated as gameplay continues (action block 5007). These game metrics include not only game variables (e.g., "badges," forests, groves, and so on), but also the social media performance metrics, discussed with reference to FIG. 4a. Game server 104A updates database 104B.

As illustrated in FIG. 5, prior to investing the electronic payment after game metrics are updated, process 5000 determines whether sufficient funds are present before an investment is made (decision block 5008). If sufficient funds are not present, process 5000 delays any transfer of funds and electronically stores the amount, such as within client devices 105A, 105B, or 105N, until an aggregate amount is sufficient for investment (action block 5009). By pooling together investors' funds, certain investments for example, investments requiring a minimum dollar amount for greater returns can be made. Aggregating funds to minimize the number of investment purchases also reduces transaction costs. Once a sufficient amount is present for transfer including previously held funds, client device 105A, 105B, and 105N transfers a single bulk payment to Index Fund Server 102 for storage in portfolio database 102B over data network 101 (action block 5010). Process 5000 returns to action block 5002 to monitor and intercept the next in-game transaction over data network 101. Accordingly, process 5000 provides the advantage of further reducing transaction costs for greater returns.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for social networking environments, such as social networking gaming applications; however, the invention can be used for redirecting various gaming purchases into investment funds. Additionally and obviously, features may be added or subtracted as desired. Accordingly, the invention is not to be restricted except in light of the attached claims and their equivalents.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An interactive electronic gaming system comprising:
a payment gateway server;
a game server in electronic communication with said payment gateway server;
one or more client communication devices configured to create an electronic payment gateway with the payment gateway server during an in-game transaction, over a data network;
a portfolio server, the portfolio server is accessible to the client communication device over said data network;
a portfolio database in electronic communication to said portfolio server for maintaining electronic investment portfolios;
wherein the game server is operatively coupled to a computer program product, the computer program product having a computer-usable medium having a sequence of instructions which, when executed by a processor, causes said processor to execute a process that creates investment projections based on the intercepted payment transaction and redirects electronic transfer to said portfolio database, said process comprising:
hosting at the game server a game, the game configured to receive electronic payments in exchange for virtual currency;
intercepting a transaction through the electronic payment gateway the transaction having a first numerical amount of actual electronic funds in exchange for virtual currency;
computing an expected return, wherein the return is based on the investment of the first numerical amount of actual electronic funds;
modifying a game metric, a game variable, or both, based on the first numerical amount of actual electronic funds; and
electronically transferring the first numerical amount of actual electronic funds to the portfolio database at the portfolio server over said data network in exchange for virtual currency to be used during the game.

2. The system of claim 1, wherein the process further includes the step of selecting long-term financial investment goals.

3. The system of claim 2, wherein the process further includes the step of maintaining game metrics, said game metrics based on the relative performance of investments compared to said long-term financial investment goals.

4. The system of claim 1, wherein the process further includes the step of publishing game metrics to said game server, said game metrics comparing a single user's investment performance to the average investment performance for all users stored in said portfolio database.

5. The system of claim 1, wherein the process further includes the step of aggregating said first numerical amount with additional actual electronic funds prior to transferring said first numerical transaction amount.

6. The system of claim 1, wherein said game server represents a social media platform.

7. The system of claim 1, wherein said game server represents a stand-alone kiosk configured to receive both electronic and physical funds.

8. The system of claim 1, wherein computing an expected return from investing the first transaction reflects the historical performance of similar investments designed according to Modern Portfolio Theory (MPT).

9. The system of claim 1, wherein user input modifies the first transaction amount.

10. The system of claim 1, wherein the portfolio server represents a collective investment scheme.

11. A method of redirecting in-game consumer transactions between a game server in electronic communication with a payment gateway server to a portfolio database, said payment gateway server configured to create an electronic payment gateway with the game server, the method comprising:
intercepting a transaction through the electronic payment gateway, the transaction having a first numerical amount of actual electronic funds in exchange for virtual currency, the electronic payment gateway created by the electronic gateway server;
computing an expected return, wherein the return is based on the investment of the first numerical amount of actual electronic funds; and
modifying a game metric, a game variable, or both, based on the first numerical amount of actual electronic funds; and
electronically transferring, by the game server, the first numerical amount of actual electronic funds to the portfolio database over a data network in exchange for virtual currency.

12. The method of claim 11, further comprising converting actual funds, deposited to the game server, to an electronic payment for transfer over said electronic payment gateway prior to intercepting said transaction.

13. The method of claim 11, further comprising the step of hosting a game at the game server, the game configured to receive electronic payments in exchange for virtual currency.

14. The method of claim 13, further comprising publishing game metrics to said game server, said game metrics comparing the relative performance of a single consumer's investment performance to the average investment performance for consumer accounts stored in said portfolio database.

15. The method of claim 11, further comprising aggregating said first numerical amount with additional actual electronic funds prior to transferring said first numerical transaction amount.

16. The method of claim 11, wherein said game server represents a social media platform.

17. The method of claim 11, wherein said game server represents a stand-alone kiosk.

18. The method of claim 11, wherein computing an expected return from investing the first transaction reflects the historical performance of similar investments designed according to Modern Portfolio Theory (MPT).

19. The method of claim 11, further comprising modifying the first transaction amount based on user input.

20. The method of claim 11, wherein said portfolio database represents a collective investment scheme.

\* \* \* \* \*